United States Patent
Some

(10) Patent No.: US 12,135,316 B2
(45) Date of Patent: Nov. 5, 2024

(54) CONTROLLING THE PURIFICATION OF A MACROMOLECULE SOLUTION VIA REAL-TIME MULTI-ANGLE LIGHT SCATTERING

(71) Applicant: Wyatt Technology, LLC, Goleta, CA (US)

(72) Inventor: Daniel I. Some, Atlit (IL)

(73) Assignee: Wyatt Technology, LLC, Goleta, CA (US)

(*) Notice: Subject to any disclaimer, the term of this patent is extended or adjusted under 35 U.S.C. 154(b) by 307 days.

(21) Appl. No.: 17/855,791

(22) Filed: Jun. 30, 2022

(65) Prior Publication Data

US 2023/0022034 A1    Jan. 26, 2023

Related U.S. Application Data

(60) Provisional application No. 63/217,274, filed on Jun. 30, 2021.

(51) Int. Cl.
*G01N 30/74* (2006.01)
*G01N 30/02* (2006.01)
*G01N 30/64* (2006.01)

(52) U.S. Cl.
CPC ............ *G01N 30/74* (2013.01); *G01N 30/64* (2013.01); *G01N 2030/027* (2013.01)

(58) Field of Classification Search
None
See application file for complete search history.

(56) References Cited

U.S. PATENT DOCUMENTS

| | | | | |
|---|---|---|---|---|
| 6,395,538 | B1 * | 5/2002 | Naughton | G01N 21/35 |
| | | | | 435/173.7 |
| 6,865,926 | B2 * | 3/2005 | O'Brien | G01N 30/22 |
| | | | | 73/23.42 |
| 9,568,462 | B2 * | 2/2017 | Reed | G01N 21/47 |
| 11,162,936 | B2 * | 11/2021 | Holmes | G01N 21/07 |
| 11,567,043 | B2 * | 1/2023 | Li | G01N 30/62 |
| 2018/0224473 | A1 * | 8/2018 | Reed | G01N 21/53 |
| 2020/0200686 | A1 | 6/2020 | Reed et al. | |
| 2021/0149361 | A1 | 5/2021 | Jungbauer et al. | |

OTHER PUBLICATIONS

International Search Report and Written Opinion in PCT/US2023/025807 mailed on Sep. 26, 2023.
Walch, et al. "Prediction of the Quantity and Purity of an Antibody Capture Process in Real Time," Biotechnology Journal, vol. 14, No. 7, May 20, 2019.

* cited by examiner

*Primary Examiner* — Peter J Macchiarolo
*Assistant Examiner* — Jermaine L Jenkins
(74) *Attorney, Agent, or Firm* — Leonard Guzman

(57) ABSTRACT

The present disclosure describes a computer implemented method, a system, and a computer program product of controlling the purification of a macromolecule solution via real-time multi-angle light scattering.

14 Claims, 9 Drawing Sheets

CONTROLLING THE PURIFICATION OF A MACROMOLECULE SOLUTION VIA REAL-TIME MULTI-ANGLE LIGHT SCATTERING

BACKGROUND

The present disclosure relates to multi-angle light scattering, and more specifically, to controlling the purification of a macromolecule solution via real-time multi-angle light scattering.

SUMMARY

The present disclosure describes a computer implemented method, a system, and a computer program product of controlling the purification of a macromolecule solution via real-time multi-angle light scattering. In an exemplary embodiment, the computer implemented method, the system, and the computer program product include (1) receiving, by a computer system, from a set of instruments baseline multi-angle light scattering (MALS) signal values and baseline ultraviolet (UV) signal values of a pure buffer flowed from a chromatographic purification system to the set of instruments, where the set of instruments includes a MALS instrument and a UV detector, (2) in response to receiving the baseline MALS signal values from the MALS instrument, (a) receiving, by the computer system, from the MALS instrument scattering intensity values of a sample solution flowed from the chromatographic purification system to the MALS instrument over a time series, where the sample solution includes at least one type of macromolecule, (b) calculating, by the computer system, an average of the baseline MALS signal values, and (c) subtracting, by the computer system, the average of the baseline MALS signal values from the scattering intensity values, resulting in an intensity time series of excess scattering intensity values, $Iscatt_j$, (3) in response to receiving the baseline UV signal values from the UV detector, (a) receiving, by the computer system, from the UV detector UV absorption values of the sample solution flowed from the chromatographic purification system to the UV detector over the time series, (b) calculating, by the computer system, an average of the baseline UV signal values, (c) executing, by the computer system, a set of logical operations applying UV absorption alignment corrections with respect to UV absorption alignment parameters and UV absorption band broadening corrections with respect to UV absorption band broadening parameters, to the UV absorption values over the time series relative to the UV detector and the MALS instrument, resulting in corrected UV absorption values over the time series, and (d) subtracting, by the computer system, the average of the baseline UV signal values from the corrected UV absorption values, resulting in a UV time series of excess UV absorption values, (4) calculating, by the computer system, concentration values of the sample solution, $c_j$, with respect to the UV time series of excess UV absorption values and an absorption coefficient of the sample solution according to Beer's Law, (5) receiving, by the computer system, pH values of the sample solution from a pH detector, over the time series, and conductivity values of the sample solution from a conductivity detector, over the time series, where the set of instruments further comprises the pH detector and the conductivity detector, (6) executing, by the computer system, a set of logical operations (a) applying pH alignment corrections with respect to pH alignment parameters to the pH values over the time series relative to the pH detector and the MALS instrument, resulting in corrected pH values over the time series, and (b) applying conductivity alignment corrections with respect to conductivity alignment parameters to the conductivity values over the time series relative to the conductivity detector and the MALS instrument, resulting in corrected conductivity values over the time series, resulting in a plurality of signals comprising the intensity time series of excess scattering intensity values, $Iscatt_j$, the concentration values of the sample solution, $c_j$, the corrected pH values, and the corrected conductivity values, (7) executing, by the computer system, a set of logical operations averaging each of the plurality of signals over time ranges, $t_1, t_2, \ldots t_n$, where the time series includes the time ranges, where the time ranges correspond to fractions of the sample solution collected by a fraction collector connected to the set of instruments, resulting in average values, $[Iscatt, c, pH, cond]_1$, $[Iscatt, c, pH, cond]_2$, $\ldots [Iscatt, c, pH, cond]_n$, (8) receiving, by the computer system, aggregate content values, % $agg_1$, % $agg_2$, $\ldots$ % $agg_n$, and weight-average molar mass values, $M_1, M_2, \ldots M_n$, of the fractions of the sample solution measured by a SEC-MALS instrument, and (9) storing, by the computer system, in a macromolecular characterization look-up table (MCLUT) the aggregate content values, % $agg_1$, % $agg_2$, $\ldots$ % $agg_n$, and the weight-average molar mass values, $M_1, M_2, \ldots M_n$, versus the average values, $[Iscatt, c, pH, cond]_1$, $[Iscatt, c, pH, cond]_2$, $\ldots [Iscatt, c, pH, cond]_n$.

DETAILED DESCRIPTION

Figure 1A:
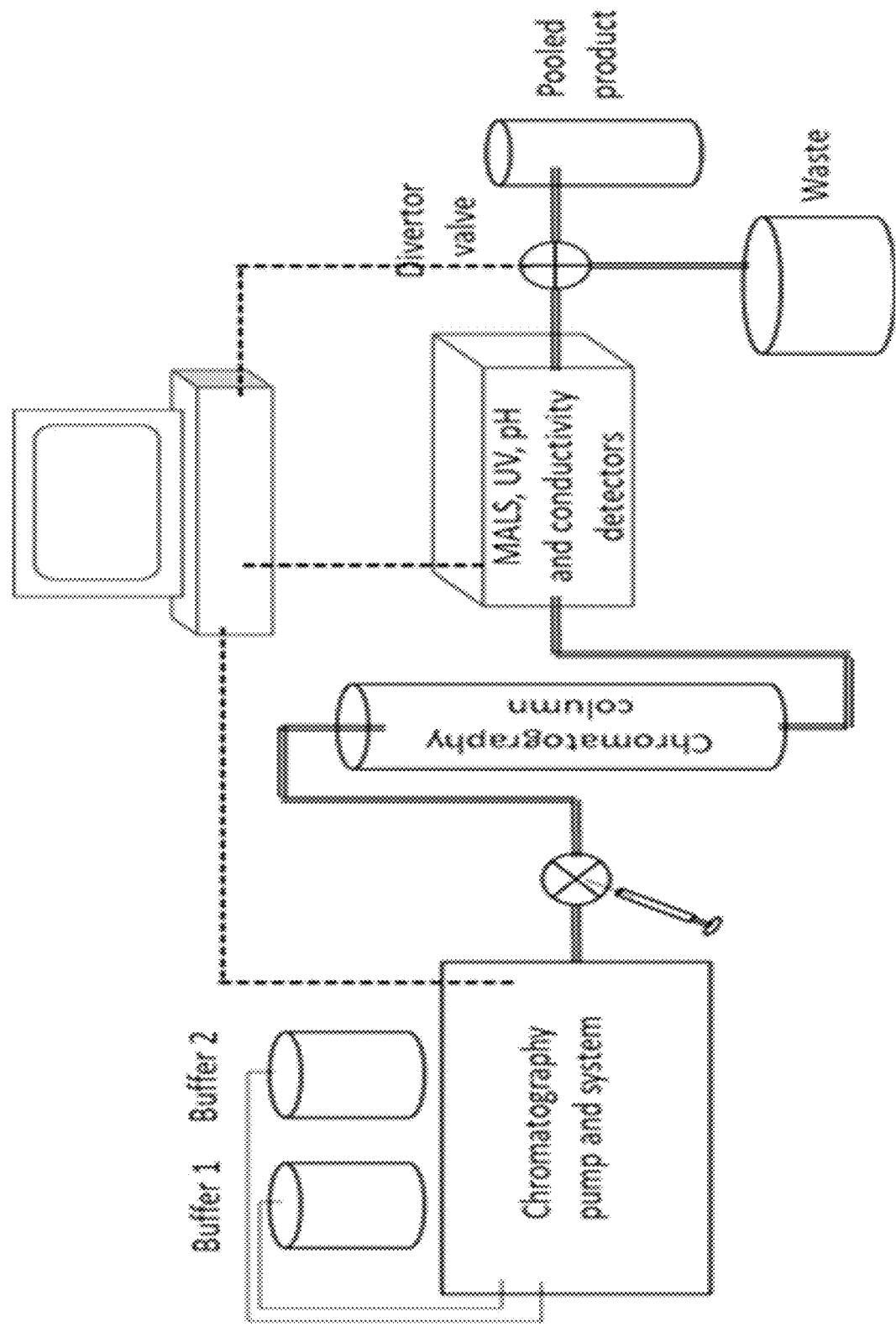
FIG. 1A depicts instruments in accordance with an embodiment.

The present disclosure describes a computer implemented method, a system, and a computer program product of controlling the purification of a macromolecule solution via real-time multi-angle light scattering. In an exemplary embodiment, the computer implemented method, the system, and the computer program product include (1) receiving, by a computer system, from a set of instruments baseline multi-angle light scattering (MALS) signal values and baseline ultraviolet (UV) signal values of a pure buffer flowed from a chromatographic purification system to the set of instruments, where the set of instruments includes a MALS instrument and a UV detector, (2) in response to receiving the baseline MALS signal values from the MALS instrument, (a) receiving, by the computer system, from the MALS instrument scattering intensity values of a sample solution flowed from the chromatographic purification system to the MALS instrument over a time series, where the sample solution includes at least one type of macromolecule, (b) calculating, by the computer system, an average of the baseline MALS signal values, and (c) subtracting, by the computer system, the average of the baseline MALS signal values from the scattering intensity values, resulting in an intensity time series of excess scattering intensity values, Iscatt$_j$, (3) in response to receiving the baseline UV signal values from the UV detector, (a) receiving, by the computer system, from the UV detector UV absorption values of the sample solution flowed from the chromatographic purification system to the UV detector over the time series, (b) calculating, by the computer system, an average of the baseline UV signal values, (c) executing, by the computer system, a set of logical operations applying UV absorption alignment corrections with respect to UV absorption alignment parameters and UV absorption band broadening corrections with respect to UV absorption band broadening parameters, to the UV absorption values over the time series relative to the UV detector and the MALS instrument, resulting in corrected UV absorption values over the time series, and (d) subtracting, by the computer system, the average of the baseline UV signal values from the corrected UV absorption values, resulting in a UV time series of excess UV absorption values, (4) calculating, by the computer system, concentration values of the sample solution, $c_j$, with respect to the UV time series of excess UV absorption values and an absorption coefficient of the sample solution according to Beer's Law, (5) receiving, by the computer system, pH values of the sample solution from a pH detector, over the time series, and conductivity values of the sample solution from a conductivity detector, over the time series, where the set of instruments further comprises the pH detector and the conductivity detector, (6) executing, by the computer system, a set of logical operations (a) applying pH alignment corrections with respect to pH alignment parameters to the pH values over the time series relative to the pH detector and the MALS instrument, resulting in corrected pH values over the time series, and (b) applying conductivity alignment corrections with respect to conductivity alignment parameters to the conductivity values over the time series relative to the conductivity detector and the MALS instrument, resulting in corrected conductivity values over the time series, resulting in a plurality of signals comprising the intensity time series of excess scattering intensity values, Iscatt$_j$, the concentration values of the sample solution, $c_j$, the corrected pH values, and the corrected conductivity values, (7) executing, by the computer system, a set of logical operations averaging each of the plurality of signals over time ranges, $t_1, t_2, \ldots t_n$, where the time series includes the time ranges, where the time ranges correspond to fractions of the sample solution collected by a fraction collector connected to the set of instruments, resulting in average values, [Iscatt, c, pH, cond]$_1$, [Iscatt, c, pH, cond]$_2$, … [Iscatt, c, pH, cond]$_n$, (8) receiving, by the computer system, aggregate content values, % agg$_1$, % agg$_2$, … % agg$_n$, and weight-average molar mass values, $M_1, M_2, \ldots M_n$, of the fractions of the sample solution measured by a SEC-MALS instrument, and (9) storing, by the computer system, in a macromolecular characterization look-up table (MCLUT) the aggregate content values, % agg$_1$, % agg$_2$, … % agg$_n$, and the weight-average molar mass values, $M_1, M_2, \ldots M_n$, versus the average values, [Iscatt, c, pH, cond]$_1$, [Iscatt, c, pH, cond]$_2$, … [Iscatt, c, pH, cond]$_n$. In an embodiment, the absorption coefficient of the sample solution is a property of the sample solution. In an embodiment, the absorption coefficient is received from user input.

In an embodiment, the method, system, and computer program product improve chromatographic purification of monoclonal antibodies and other protein-based biopharmaceuticals by means of real-time MALS, by overcoming obstacles to identifying the elution of aggregated proteins which must be separated from monomeric proteins. In an embodiment, the method, system, and computer program product diverts the process stream to 'pool' when aggregate levels are sufficiently low, and to 'waste' when they are not.

In an embodiment, the method, system, and computer program product address the need to determine, on-line and in real time, whether aggregates are present in the eluate in order to trigger optimal monomer collection in the pool, utilizing RT-MALS and additional real-time measurements. In an embodiment, the method, system, and computer program product address the complexity and confounding factors that arise as a result of changing protein concentration and buffer conditions.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Light Scattering

Light scattering (LS) is a non-invasive technique for characterizing macromolecules and a wide range of particles in solution. The two types of light scattering detection frequently used for the characterization of macromolecules are static light scattering and dynamic light scattering.

Dynamic Light Scattering

Dynamic light scattering is also known as quasi-elastic light scattering (QELS) and photon correlation spectroscopy (PCS). In a DLS experiment, time-dependent fluctuations in the scattered light signal are measured using a fast photodetector. DLS measurements determine the diffusion coefficient of the molecules or particles, which can in turn be used to calculate their hydrodynamic radius.

Static Light Scattering

Static light scattering (SLS) includes a variety of techniques, such as single angle light scattering (SALS), dual angle light scattering (DALS), low angle light scattering (LALS), and multi-angle light scattering (MALS). SLS experiments generally involve the measurement of the absolute intensity of the light scattered from a sample in solution that is illuminated by a fine beam of light. Such measurement is often used, for appropriate classes of particles/molecules, to determine the size and structure of the sample molecules or particles, and, when combined with knowledge of the sample concentration, the determination of weight average molar mass. In addition, nonlinearity of the intensity of scattered light as a function of sample concentration may be used to measure interparticle interactions and associations.

Multi-Angle Light Scattering

Multi-angle light scattering (MALS) is a SLS technique for measuring the light scattered by a sample into a plurality of angles. It is used for determining both the absolute molar mass and the average size of molecules in solution, by detecting how they scatter light. Collimated light from a laser source is most often used, in which case the technique can be referred to as multiangle laser light scattering (MALLS). The "multi-angle" term refers to the detection of scattered light at different discrete angles as measured, for example, by a single detector moved over a range that includes the particular angles selected or an array of detectors fixed at specific angular locations.

A MALS measurement requires a set of ancillary elements. Most important among them is a collimated or focused light beam (usually from a laser source producing a collimated beam of monochromatic light) that illuminates a region of the sample. The beam is generally plane-polarized perpendicular to the plane of measurement, though other polarizations may be used especially when studying anisotropic particles. Another required element is an optical cell to hold the sample being measured. Alternatively, cells incorporating means to permit measurement of flowing samples may be employed. If single-particles scattering properties are to be measured, a means to introduce such particles one-at-a-time through the light beam at a point generally equidistant from the surrounding detectors must be provided.

Although most MALS-based measurements are performed in a plane containing a set of detectors usually equidistantly placed from a centrally located sample through which the illuminating beam passes, three-dimensional versions also have been developed where the detectors lie on the surface of a sphere with the sample controlled to pass through its center where it intersects the path of the incident light beam passing along a diameter of the sphere. The MALS technique generally collects multiplexed data sequentially from the outputs of a set of discrete detectors. The MALS light scattering photometer generally has a plurality of detectors.

Normalizing the signals captured by the photodetectors of a MALS detector at each angle may be necessary because different detectors in the MALS detector (i) may have slightly different quantum efficiencies and different gains, and (ii) may look at different geometrical scattering volumes. Without normalizing for these differences, the MALS detector results could be nonsensical and improperly weighted toward different detector angles.

Concentration Detector
Differential Refractive Index Detector

A differential refractive index detector (dRI), or differential refractometer, or refractive index detector (RI or RID), is a detector that measures the refractive index of an analyte relative to the solvent. They are often used as detectors for high-performance liquid chromatography and size exclusion chromatography. dRIs are considered to be universal detectors because they can detect anything with a refractive index different from the solvent, but they have low sensitivity. When light leaves one material and enters another it bends, or refracts. The refractive index of a material is a measure of how much light bends when it enters.

A differential refractive index detector contain a flow cell with the following two parts: one for the sample; and one for the reference solvent. The dRI measures the refractive index of both components. When only solvent is passing through the sample component, the measured refractive index of both components is the same, but when an analyte passes through the flow cell, the two measured refractive indices are different. The difference appears as a peak in the chromatogram. Differential refractive index detectors are often used for the analysis of polymer samples in size exclusion chromatography. A dRI could output a concentration detector signal value corresponding to a concentration value of a sample.

Ultraviolet-Visible Spectroscopy

Ultraviolet-visible spectroscopy or ultraviolet-visible spectrophotometry (UV-Vis or UV/Vis) refers to absorption spectroscopy or reflectance spectroscopy in the ultraviolet-visible spectral region. An ultraviolet-visible detector/ultraviolet-visible spectrophotometer uses light in the visible and adjacent ranges, where the absorption or reflectance in the visible range directly affects the perceived color of the chemicals involved, where in this region of the electromagnetic spectrum, atoms and molecules undergo electronic transitions. Such absorption spectroscopy measures transitions from the ground state to the excited state. An ultraviolet-visible detector/ultraviolet-visible spectrophotometer measures the intensity of light passing through a sample (I), and compares it to the intensity of light before it passes through the sample ($I_o$), where the ratio $I/I_o$ is called the transmittance, and is usually expressed as a percentage (% T). The absorbance, A, is based on the transmittance according to $$A = -\log(\% T/100\%).$$

The UV-visible spectrophotometer can also be configured to measure reflectance, where the spectrophotometer measures the intensity of light reflected from a sample (I), and compares it to the intensity of light reflected from a reference material ($I_o$), where the ratio $I/I_o$ is called the reflectance, and is usually expressed as a percentage (% R). An ultraviolet absorption detector could output a concentration detector signal value corresponding to a concentration value of a sample.

Current Technology

In the course of production of therapeutic proteins such as monoclonal antibodies (mAbs), the proteins are produced by fermentation of cells in bioreactors. While substantial purification from lysate, nucleic acids and most host cell proteins is readily accomplished, the pure, monomeric form of the protein must be further purified from undesirable aggregates. Often such purification is accomplished by chromatographic means, such as size-exclusion chromatography, ion-exchange chromatography, hydrophobic interaction chromatography, affinity chromatography or membrane chromatography. In the course of chromatographic purification, the desired and undesired components are dissolved or suspended in solution and either caused to flow through a stationary phase such as a column or membrane, or first loaded onto the column or membrane under one buffer condition (load buffer) and then eluted from the column or membrane under one or more buffer conditions (elution buffer) that differ from the load buffer.

As a result of flowing through the stationary phase, the various components such as monomers and aggregates are separated and elute at different times. However, in typical production processes some portion of the aggregates elutes together with pure monomers in a ratio that varies with time and/or elution conditions such as buffer salt concentration. Specific fractions of the eluting material are collected and pooled under the assumption that they contain the desirable components, in this case the pure monomers, with minimal admixture of the undesirable components. Maintaining the correct cutoff points that optimize the collection of monomers and reduce the aggregate component to within an acceptable level is a significant challenge that impacts yield and profitability.

To characterize the purification process, multiple test fractions are acquired and analyzed on separate, off-line analytical instruments to determine the type and quantities of solution components in each. These properties are correlated to process parameters such as elution time and signal levels from a concentration detector such as a UV absorption detector. Then, during actual purification runs, a pool of material is collected according to the time and signal levels corresponding to those where the test fractions yielded optimal results in terms of purity and quantity. The final pool may be considered sufficiently pure or may be processed via an additional purification step to further remove impurities. However, none of the information obtained online in the course of purification is sufficiently definitive to decide if aggregates are actually present in the pool or their quantity; additional off-line testing must be done to verify that the correct fractions have been pooled. Unintended variations in elution conditions, column aging and other factors may alter the monomer-aggregate co-elution properties relative to the initial characterization of test fractions, leading to either unacceptable aggregate levels in the pool (requiring rejection and either repurification or discarding the lot) or loss of valuable monomer which should have been collected but was not.

Various methods to meet this need have been proposed and tested, including dual-wavelength UV extinction, Raman scattering and static light scattering (the latter includes MALS). Most of these measurement techniques have generally not been found to be sufficiently sensitive to the presence of aggregates so as to meet industry needs. MALS, which provides a signal that is relative to the product of the weight-average molar mass $M_w$ and concentration c of the protein in solution, does, in principle, have sufficient sensitivity since the presence of aggregates disproportionately increases $M_w$ and hence the light scattering amplitude. However, under typical purification conditions high protein concentration that varies over the elution, and/or changing pH and salt concentration—the impact of these parameters on the light scattering amplitude can be larger than the desired sensitivity to aggregates, reducing the suitability of MALS for the application.

Therefore, it is advantageous to implement instrumentation and a method for determining, on-line and in real time, whether aggregates are present in the eluate, and their concentration, in order to specify with definitive knowledge the optimal fractions to be collected as they elute. Thus, there is a need to control the purification of a macromolecule solution via real-time multi-angle light scattering.

Figure 1B:
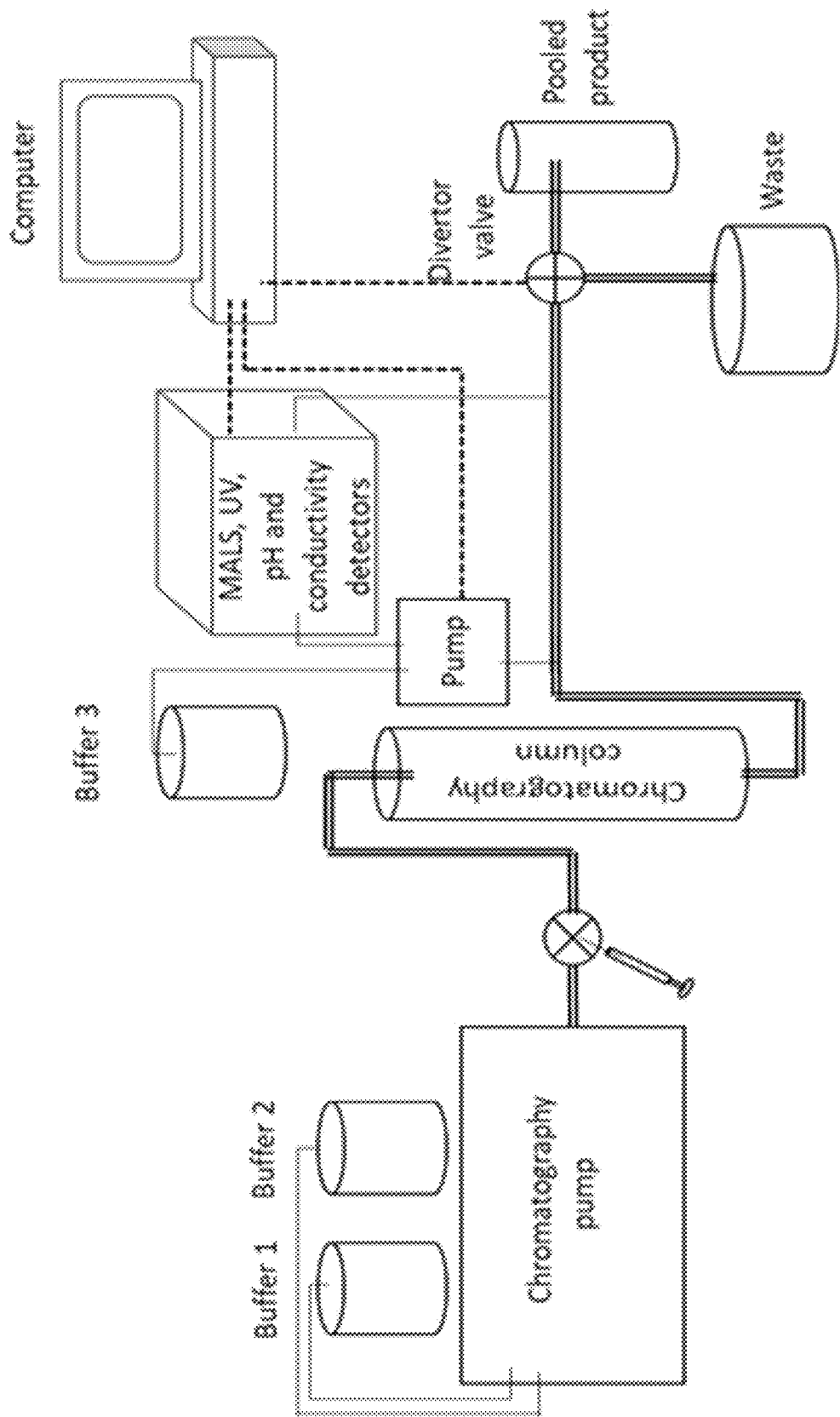
FIG. 1B depicts instruments in accordance with an embodiment.
Figure 1C:
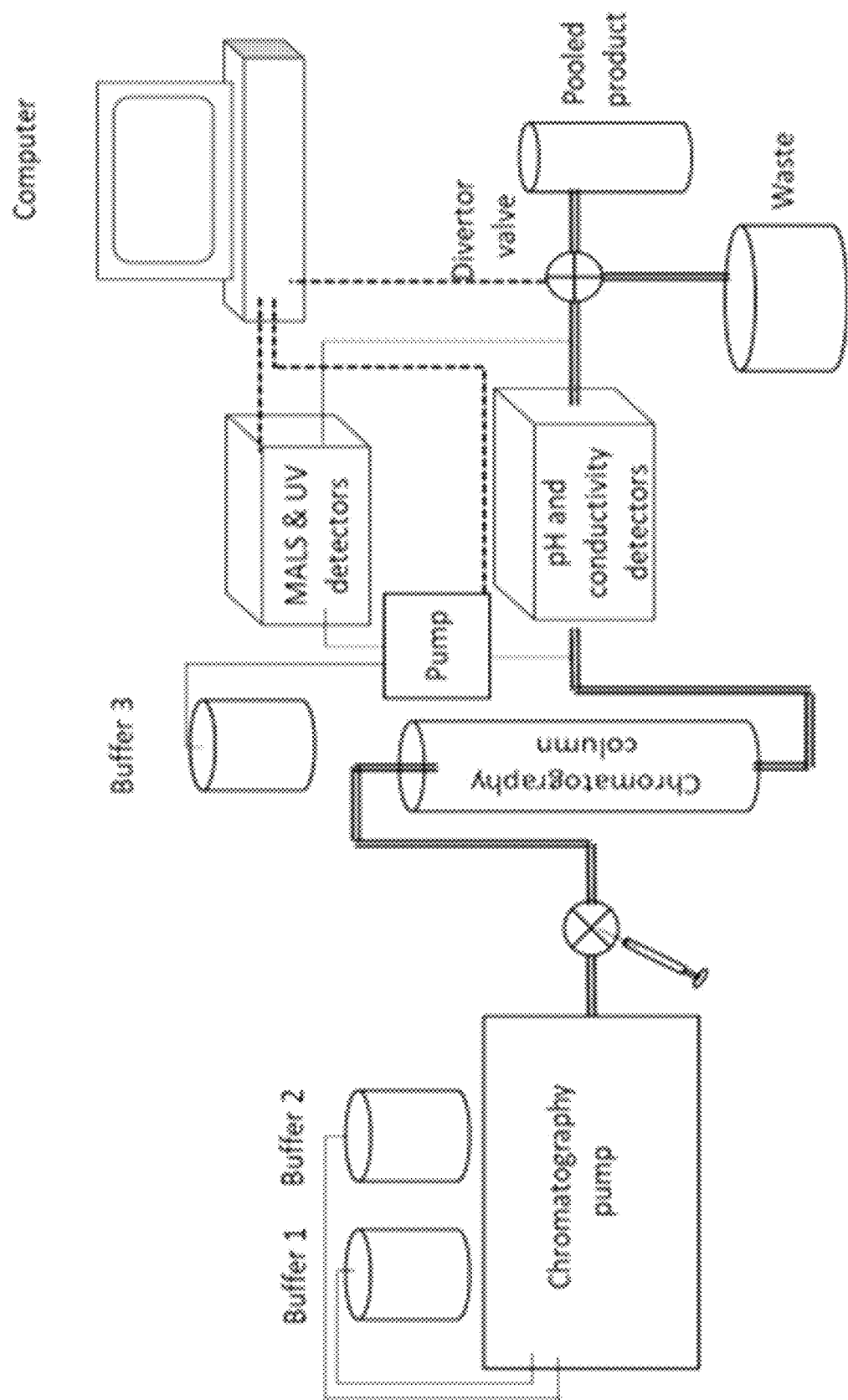
FIG. 1C depicts instruments in accordance with an embodiment.
Figure 3:
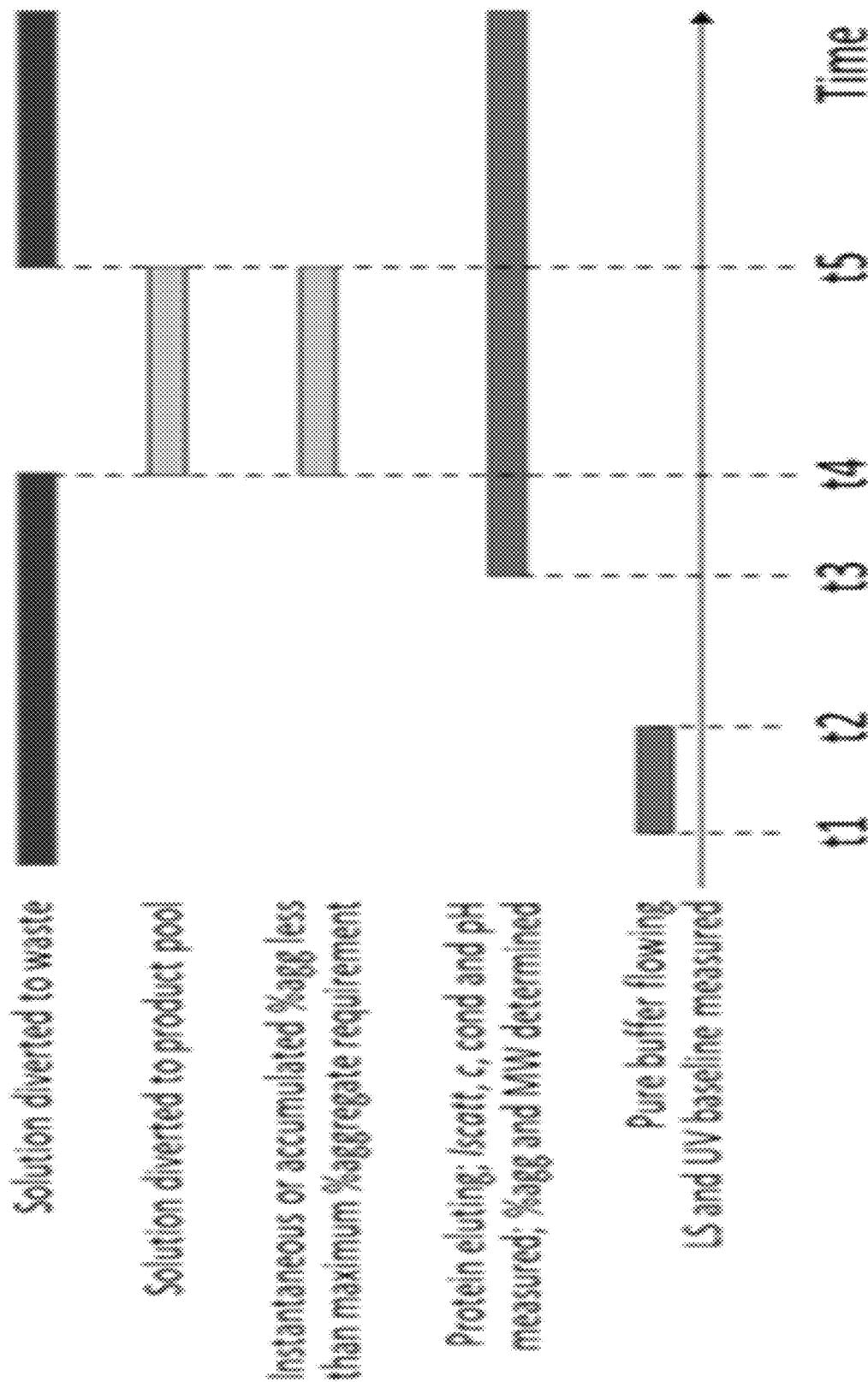
FIG. 3 depicts times in accordance with an embodiment.
Figure 4:
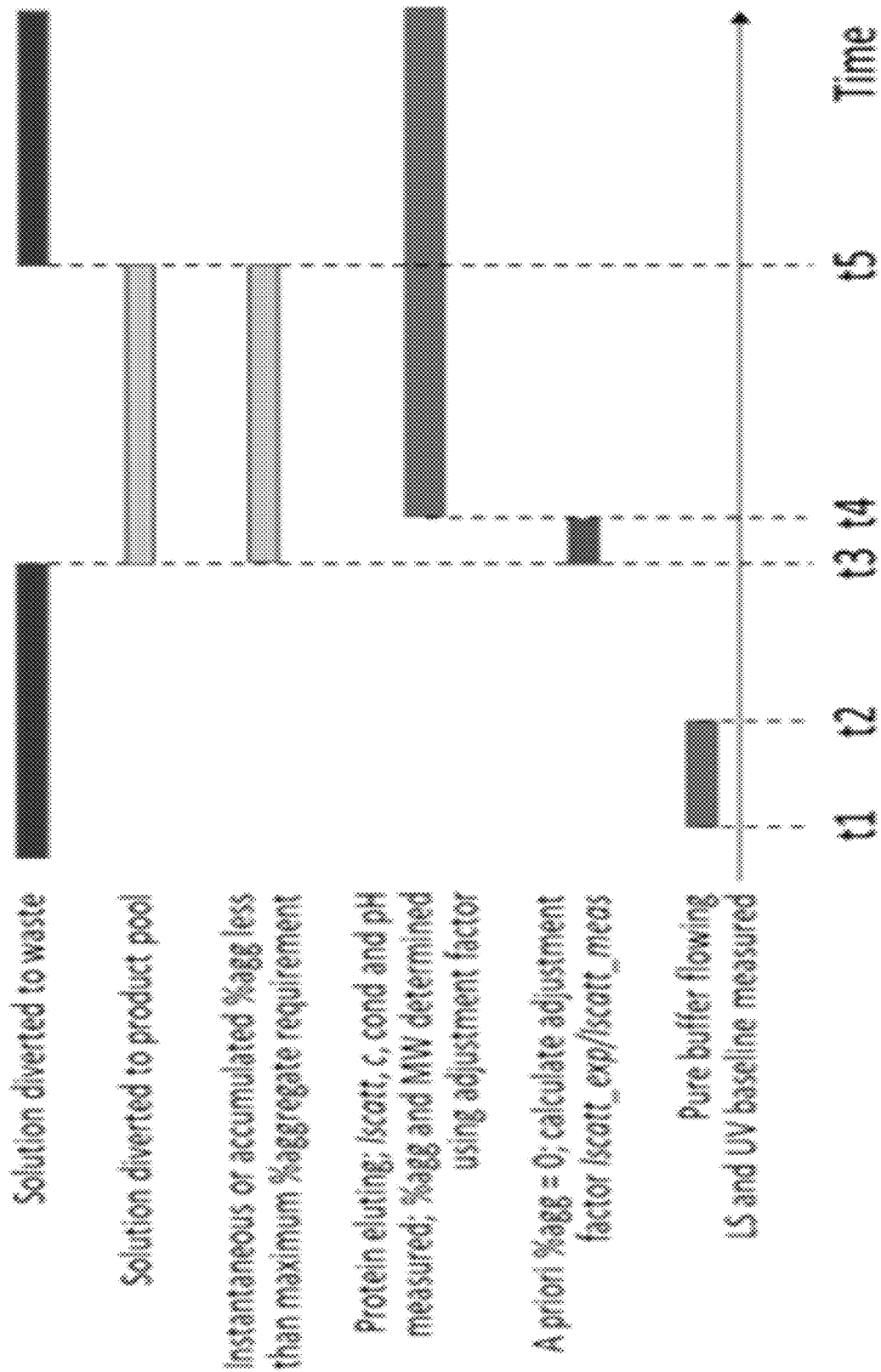
FIG. 4 depicts times in accordance with an embodiment.

In an embodiment, FIG. 1A, FIG. 1B, and FIG. 1C depict hardware/instrument configurations of the method, system, and computer product. Also, in an embodiment, FIG. 3 depicts times t1, t2, t3, t4, and t5, of the method, system, and computer product. In an embodiment, FIG. 4 depicts times t1, t2, t3, t4, and t5, of the method, system, and computer product.

Figure 2A:
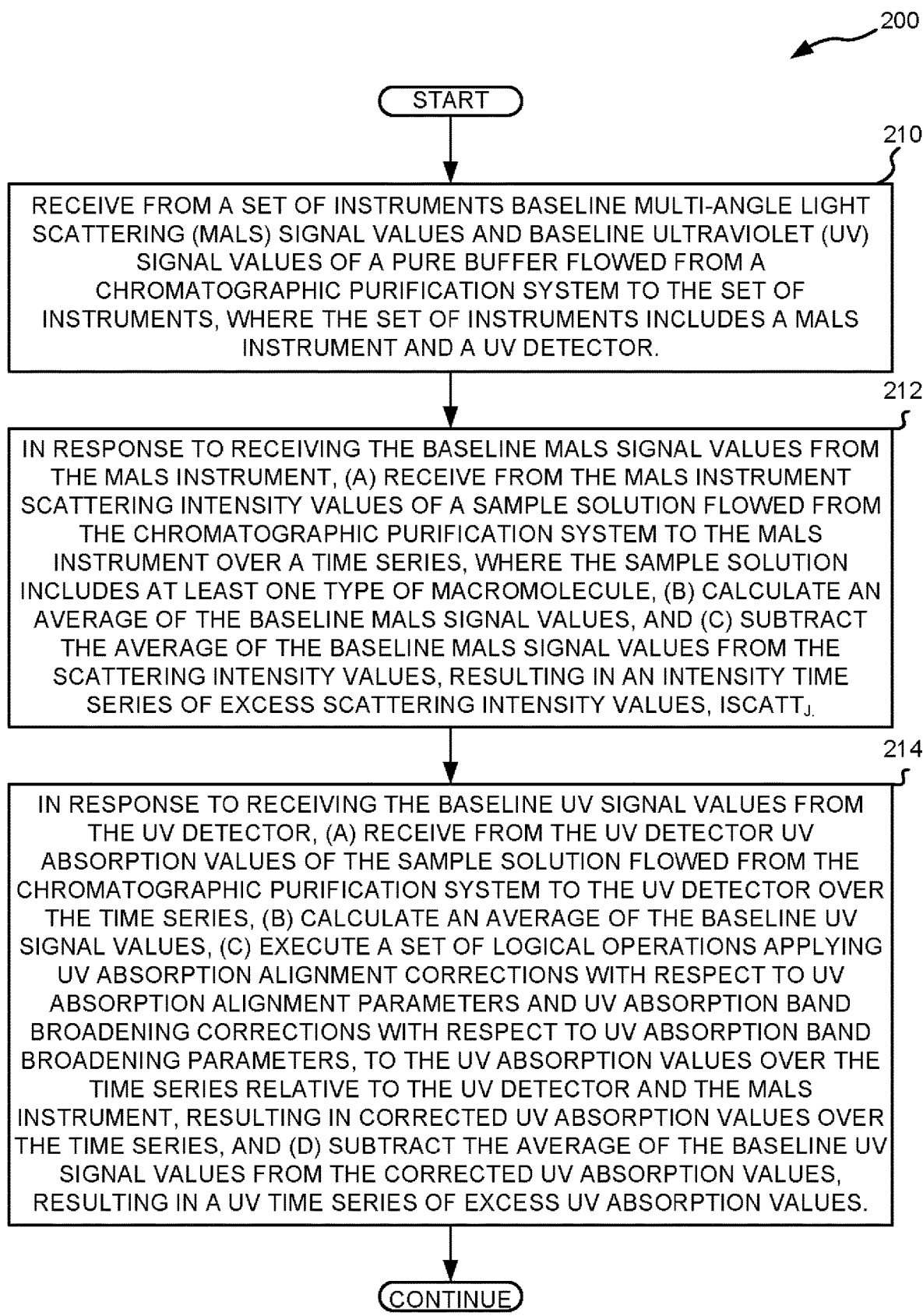
FIG. 2A depicts a flowchart in accordance with an exemplary embodiment.
Figure 2B:
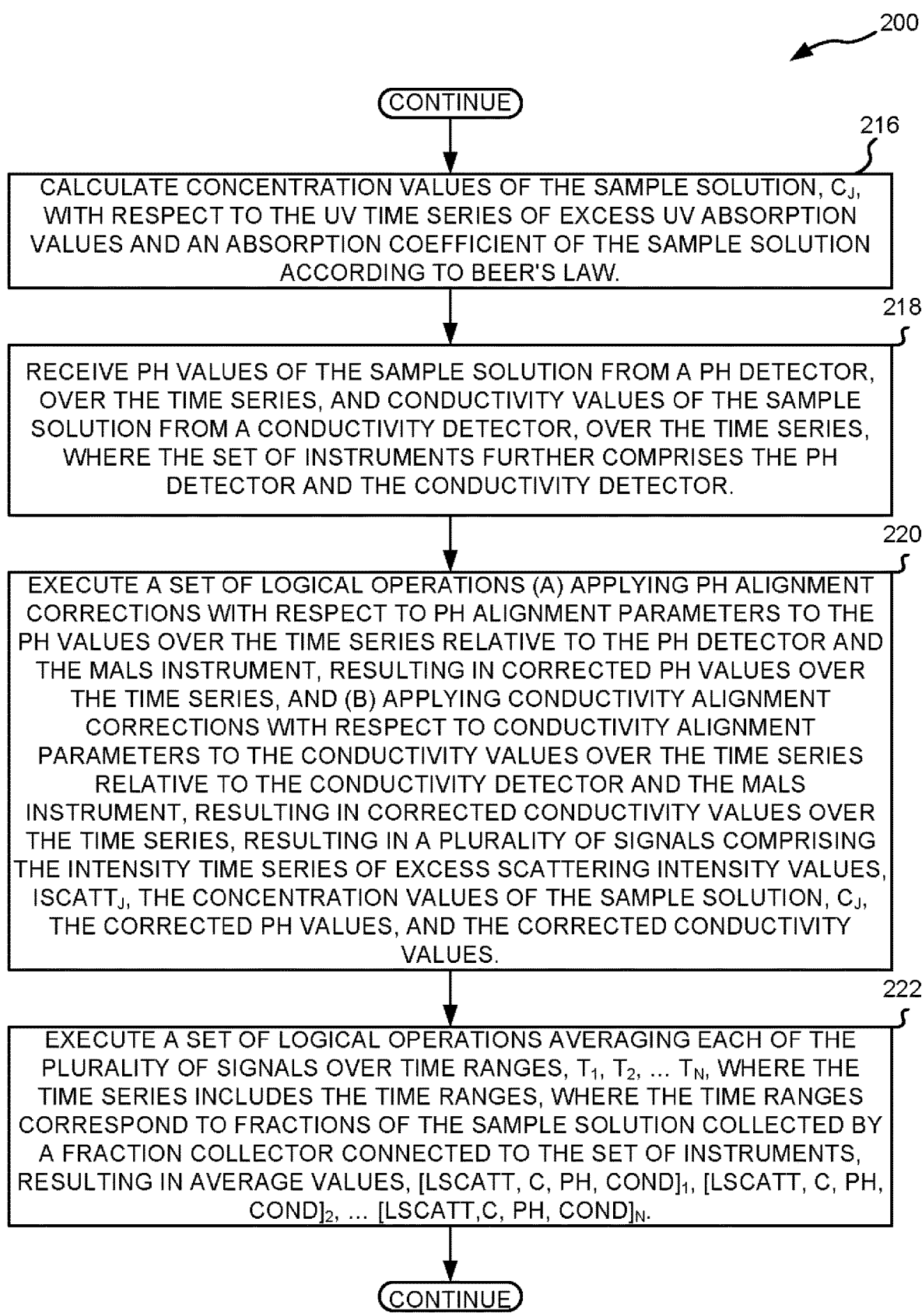
FIG. 2B depicts a flowchart in accordance with an exemplary embodiment.
Figure 2C:
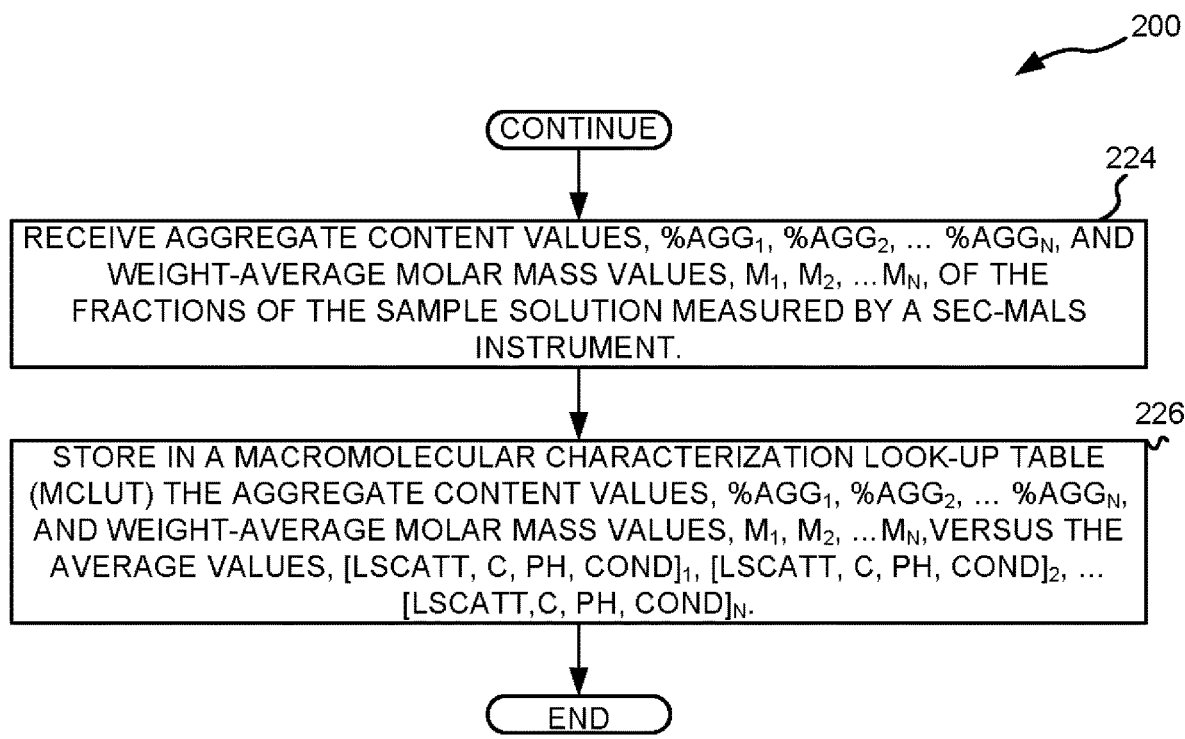
FIG. 2C depicts a flowchart in accordance with an exemplary embodiment.

Referring to FIG. 2A, FIG. 2B and FIG. 2C, in an exemplary embodiment, the computer implemented method, the system, and the computer program product are configured to perform an operation 210 receiving, by a computer system, from a set of instruments baseline multi-angle light scattering (MALS) signal values and baseline ultraviolet (UV) signal values of a pure buffer flowed from a chromatographic purification system to the set of instruments, where the set of instruments includes a MALS instrument and a UV detector, an operation 212 of, in response to receiving the baseline MALS signal values from the MALS instrument, (a) receiving, by the computer system, from the MALS instrument scattering intensity values of a sample solution flowed from the chromatographic purification system to the MALS instrument over a time series, where the sample solution includes at least one type of macromolecule, (b) calculating, by the computer system, an average of the baseline MALS signal values, and (c) subtracting, by the computer system, the average of the baseline MALS signal values from the scattering intensity values, resulting in an intensity time series of excess scattering intensity values, $Iscatt_j$, an operation 214 of, in response to receiving the baseline UV signal values from the UV detector, (a) receiving, by the computer system, from the UV detector UV absorption values of the sample solution flowed from the chromatographic purification system to the UV detector over the time series, (b) calculating, by the computer system, an average of the baseline UV signal values, (c) executing, by the computer system, a set of logical operations applying UV absorption alignment corrections with respect to UV absorption alignment parameters and UV absorption band broadening corrections with respect to UV absorption band broadening parameters, to the UV absorption values over the time series relative to the UV detector and the MALS instrument, resulting in corrected UV absorption values over the time series, and (d) subtracting, by the computer system, the average of the baseline UV signal values from the corrected UV absorption values, resulting in a UV time series of excess UV absorption values, an operation 216 of calculating, by the computer system, concentration values of the sample solution, $c_j$, with respect to the UV time series of excess UV absorption values and an absorption coefficient of the sample solution according to Beer's Law, an operation 218 of receiving, by the computer system, pH values of the sample solution from a pH detector, over the time series, and conductivity values of the sample solution from a conductivity detector, over the time series, where the set of instruments further comprises the pH detector and the conductivity detector, an operation 220 of executing, by the computer system, a set of logical operations (a) applying pH alignment corrections with respect to pH alignment parameters to the pH values over the time series relative to the pH detector and the MALS instrument, resulting in corrected pH values over the time series, and (b) applying conductivity alignment corrections with respect to conductivity alignment parameters to the conductivity values over the time series relative to the conductivity detector and the MALS instrument, resulting in corrected conductivity values over the time series, resulting in a plurality of signals comprising the intensity time series of excess scattering intensity values, $Iscatt_j$, the concentration values of the sample solution, $c_j$, the corrected pH values, and the corrected conductivity values, an operation 222 of executing, by the computer system, a set of logical operations averaging each of the plurality of signals over time ranges, $t_1, t_2, \ldots t_n$, where the time series includes the time ranges, where the time ranges correspond to fractions of the sample solution collected by a fraction collector connected to the set of instruments, resulting in average values, $[Iscatt, c, pH, cond]_1, [Iscatt, c, pH, cond]_2, \ldots [Iscatt, c, pH, cond]_n$, an operation 224 of receiving, by the computer system, aggregate content values, $\%\ agg_1, \%\ agg_2, \ldots \%\ agg_n$, and weight-average molar mass values, $M_1, M_2, \ldots M_n$, of the fractions of the sample solution measured by a SEC-MALS instrument, and an operation 226 of storing, by the computer system, in a macromolecular characterization look-up table (MCLUT)

the aggregate content values, % $agg_1$, % $agg_2$, ... % $agg_n$, and the weight-average molar mass values, $M_1, M_2, \ldots M_n$, versus the average values, [Iscatt, c, pH, cond]$_1$, [Iscatt, c, pH, cond]$_2$, ... [Iscatt, c, pH, cond]$_n$.

Figure 5:
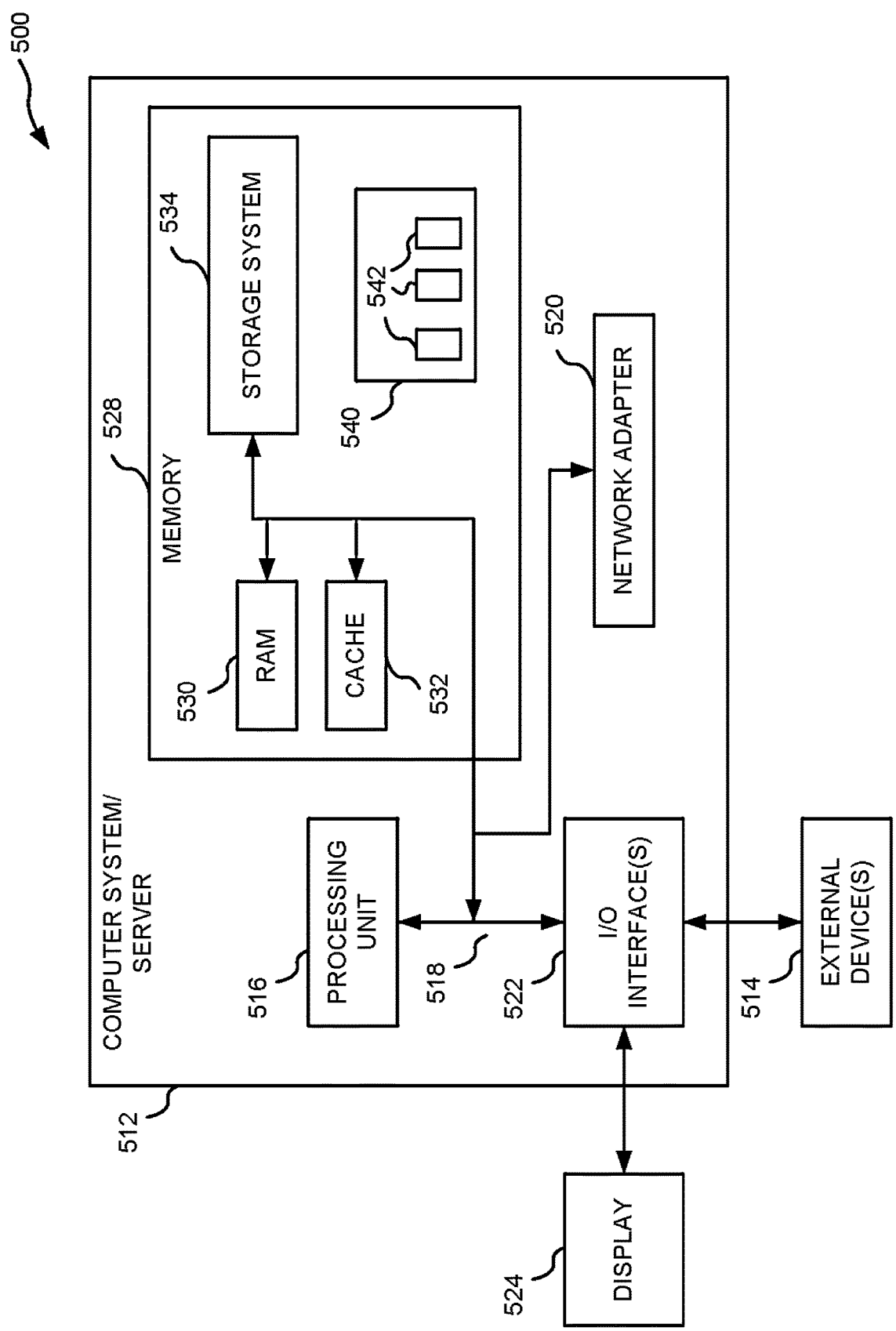
FIG. 5 depicts a computer system in accordance with an exemplary embodiment.

In an exemplary embodiment, the computer system is a standalone computer system, such as computer system 500 shown in FIG. 5, a network of distributed computers, where at least some of the computers are computer systems such as computer system 500 shown in FIG. 5, or a cloud computing node server, such as computer system 500 shown in FIG. 5. In an embodiment, the computer system is a computer system 500 as shown in FIG. 5, that executes a controlling the purification of a macromolecule solution via real-time multi-angle light scattering script or computer software application that carries out the operations of at least the method. In an embodiment, the computer system is a computer system/server 512 as shown in FIG. 5, that executes a controlling the purification of a macromolecule solution via real-time multi-angle light scattering script or computer software application that carries out the operations of at least the method. In an embodiment, the computer system is a processing unit 516 as shown in FIG. 5, that executes a controlling the purification of a macromolecule solution via real-time multi-angle light scattering script or computer software application that carries out the operations of at least the method. In an embodiment, the computer system is a machine learning computer software/program/algorithm that executes a controlling the purification of a macromolecule solution via real-time multi-angle light scattering In an embodiment, the computer system is a computer system 500 as shown in FIG. 5, that executes a controlling the purification of a macromolecule solution via real-time multi-angle light scattering script or computer software application that carries out at least operations 210, 212, 214, 216, 218, 220, 222, 224, and 226. In an embodiment, the computer system is a computer system/server 512 as shown in FIG. 5, that executes a controlling the purification of a macromolecule solution via real-time multi-angle light scattering script or computer software application that carries out at least operations 210, 212, 214, 216, 218, 220, 222, 224, and 226. In an embodiment, the computer system is a processing unit 516 as shown in FIG. 5, that executes a controlling the purification of a macromolecule solution via real-time multi-angle light scattering script or computer software application that carries out at least operations 210, 212, 214, 216, 218, 220, 222, 224, and 226.

Using the MCLUT

In a further embodiment, an embodiment, the computer implemented method, the system, and the computer program product further include (1) receiving, by the computer system, from a second set of instruments second baseline MALS signal values and second baseline UV signal values of the pure buffer flowed from a second chromatographic purification system to the second set of instruments, where the second set of instruments comprises a second MALS instrument and a second UV detector, (2) in response to receiving the second baseline MALS signal values from the second MALS instrument, (a) receiving, by the computer system, from the second MALS instrument second scattering intensity values of a second sample solution flowed from the second chromatographic purification system to the second MALS instrument over a second time series, where the second sample solution contains the at least one type of macromolecule, (b) calculating, by the computer system, an average of the second baseline MALS signal values, and (c) subtracting, by the computer system, the average of the second baseline MALS signal values from the second scattering intensity values, resulting in a second intensity time series of excess scattering intensity values, Iscatt2, (3) in response to receiving the second baseline UV signal values from the second UV detector, (a) receiving, by the computer system, from the second UV detector second UV absorption values of the second sample solution flowed from the second chromatographic purification system to the second UV detector over the second time series, (b) calculating, by the computer system, an average of the second baseline UV signal values, (c) executing, by the computer system, a set of logical operations applying second UV absorption alignment corrections with respect to second UV absorption alignment parameters and second UV absorption band broadening corrections with respect to second UV absorption band broadening parameters, to the second UV absorption values over the second time series relative to the second UV detector and the second MALS instrument, resulting in second corrected UV absorption values over the second time series, and (d) subtracting, by the computer system, the average of the second baseline UV signal values from the second corrected UV absorption values, resulting in a second UV time series of excess UV absorption values, (4) calculating, by the computer system, second concentration values of the second sample solution, c2, with respect to the second UV time series of excess UV absorption values and a second absorption coefficient of the second sample solution according to Beer's Law, (5) receiving, by the computer system, second pH values of the second sample solution from a second pH detector, over the time series, and second conductivity values of the second sample solution from a second conductivity detector, over the time series, where the second set of instruments further comprises the second pH detector and the second conductivity detector, (6) executing, by the computer system, a set of logical operations (a) applying second pH alignment corrections with respect to second pH alignment parameters to the second pH values over the second time series relative to the second pH detector and the second MALS instrument, resulting in second corrected pH values over the second time series, and (b) applying second conductivity alignment corrections with respect to second conductivity alignment parameters to the second conductivity values over the second time series relative to the second conductivity detector and the second MALS instrument, resulting in second corrected conductivity values over the second time series, resulting in a second plurality of signals comprising the second intensity time series of excess scattering intensity values, Iscatt2, the second concentration values of the second sample solution, c2, the second corrected pH values, and the second corrected conductivity values, (7) retrieving, by the computer system, from the MCLUT an aggregate content value, % agg, and an weight-average molar mass, M, corresponding to the second plurality of signals, via at least one of correlation, interpolation, and extrapolation, (8) executing, by the computer system, a set of logical operations determining whether at least one property of the second sample solution has reached an aggregate content limit, with respect to at least one of the retrieved aggregate content value, % agg, the retrieved weight-average molar mass, M, and the second concentration values of the second sample solution, c2, and (9) in response to determining that the at least one property of the second sample solution has reached the aggregate content limit, transmitting, by the computer system, a divert-to-waste command to divert the sample solution to a waste container. In an embodiment, the second absorption coefficient of the sample solution is a property of the sample solution. In an embodiment, the second absorption coefficient is received from user input.

In an embodiment, the retrieving includes retrieving, by the computer system, from the MCLUT the aggregate content value, % agg, and the weight-average molar mass, M, corresponding to the second plurality of signals, via interpolation when Iscatt2, c2, the second pH values, and the second conductivity values are within values in the MCLUT. In an embodiment, the retrieving includes retrieving, by the computer system, from the MCLUT the aggregate content value, % agg, and the weight-average molar mass, M, corresponding to the second plurality of signals, via extrapolation when Iscatt2, c2, the second pH values, and the second conductivity values are outside of values in the MCLUT.

Reaching Aggregate Content Limit

In an embodiment, the determining that the at least one property of the second sample solution has reached the aggregate content limit includes determining, by the computer system, that the retrieved aggregate content value, % agg, exceeds a maximum aggregate content value. In an embodiment, the determining that the at least one property of the second sample solution has reached the aggregate content limit includes determining, by the computer system, that the retrieved weight-average molar mass, M, exceeds a maximum weight-average molar mass value.

In an embodiment, the determining that the at least one property of the second sample solution has reached the aggregate content limit includes (a) calculating, by the computer system, an accumulated aggregate content value, % $agg_{accumulated}$, with respect to a subset of aggregate content values, % $agg_k$, retrieved from the MCLUT and a subset of the second concentration values, $c2_k$, according to $$\% \ agg_{accumulated} = (\Sigma_k \% \ agg_k \times c2_k)/\Sigma_k c2_k,$$

where % $agg_k$ and $c2_k$ are determined from an effective beginning of an elution from the second chromatographic purification system, and (b) executing, by the computer system, a set of logical operations determining that the accumulated content value, % $agg_{accumulated}$, exceeds a maximum accumulated aggregate content value. In an embodiment, the effective beginning of an elution from the second chromatographic purification system is when the % $agg_{accumulated}$ summation begins.

Beginning of Elution

In an embodiment, the effective beginning of the elution of the second sample solution from the second chromatographic purification system corresponds to a time of receipt by the computer system of a trigger signal from the second chromatographic purification system. In an embodiment, the trigger signal is from at least one of user programming and an established method. For example, such a trigger signal could be used in bind-and-elute gradient ion-exchange chromatography where it is known a priori that a specific time difference between the beginning of the gradient and the elution of product contains only the desired protein, with at most a small % agg.

In an embodiment, the effective beginning of the elution of the second sample solution from the second chromatographic purification system corresponds to a time when a concentration value of the second sample solution has reached a minimum acceptable value. In an embodiment, the minimum acceptable value is user defined. For example, the minimum acceptable value could be used when the concentration builds up in the second chromatographic purification system. Also, for example, the minimum acceptable value could be used in flow-through hydrophobic interaction chromatography as a polishing step, where it is known a priori that pure monomer will be the first species to elute with appreciable concentration.

In an embodiment, the effective beginning of the elution of the second sample solution from the second chromatographic purification system corresponds to a time when a weight average molar mass of the second sample solution is within an acceptable range of molar mass values. In an embodiment, the acceptable range of molar mass values is user defined. For example, the acceptable range of molar mass values could be used in ion-exchange chromatography, where it is known a priori that the initially eluting species consist primarily of low-molar-mass species which are undesirable, and where it therefore could be advantageous to wait until the weight-average molar mass of the solution is close to that of the monomer before diverting solution to the pool. In a particular embodiment, the second sample solution includes a protein, and the acceptable range of molar mass values corresponds to a molar mass of a monomeric protein within the second sample solution. For example, the molar mass of a monomeric protein within the second sample solution could be used in size-exclusion chromatography, where it is known a priori that the initially eluting species consist primarily of aggregates which are undesirable, and where it therefore could be advantageous to wait until the weight-average molar mass of the solution is close to that of the monomer before diverting solution to the pool.

In an embodiment, the effective beginning of the elution of the second sample solution from the second chromatographic purification system corresponds to at least two of (a) a time of receipt by the computer system of a trigger signal from the second chromatographic purification system, (b) a time when a concentration value of the second sample solution has reached a minimum acceptable value, and (c) a time when a weight average molar mass of the second sample solution is within an acceptable range of molar mass values. For example, the two correspondences could be used in a variety of chromatographic purification processes by requiring that multiple conditions are met and therefore reducing the probability of collecting impurities in the pool.

Monomeric MALS Signal and MCLUT Adjustment

In a further embodiment, the computer implemented method, the system, and the computer program product further include (1) retrieving, by the computer system, from the MCLUT, an expected value of Iscatt according to measured values of c2, conductivity, and pH for a specific portion of the second sample solution flowing from the second chromatographic purification system, Iscatt_exp1, (2) calculating, by the computer system, an average value of Iscatt2 measured for the specific portion of the second sample solution flowing from the second chromatographic purification system, Iscatt_meas1, and (3) multiplying, by the computer system, the second time series of excess scattering intensity values, Iscatt2, by a ratio of Iscatt_exp1 to Iscatt_meas1, resulting in adjusted values of Iscatt2. In an embodiment, Iscatt2 is adjusted to account for calibration differences relative to the first MALS instrument.

In an embodiment, the second sample solution includes a protein, and the specific portion of the second sample solution flowing from the second chromatographic purification system corresponds to a monomeric protein. For example, the specific portion corresponding to the monomeric protein corresponds to when % agg is expected to be equal to zero.

Computer System

In an exemplary embodiment, the computer system is a computer system 500 as shown in FIG. 5. Computer system 500 is only one example of a computer system and is not intended to suggest any limitation as to the scope of use or functionality of embodiments of the present invention. Regardless, computer system 500 is capable of being implemented to perform and/or performing any of the functionality/operations of the present invention.

Computer system 500 includes a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 512 may be described in the general context of computer system-executable instructions, such as program modules, being executed by a computer system. Generally, program modules may include routines, programs, objects, components, logic, and/or data structures that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computer system 500 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions/operations of embodiments of the invention.

Program/utility 540, having a set (at least one) of program modules 542, may be stored in memory 528 by way of example, and not limitation. Exemplary program modules 542 may include an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the present invention.

Computer system/server 512 may also communicate with one or more external devices 514 such as a keyboard, a pointing device, a display 524, one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
receiving, by a computer system, from a set of instruments baseline multi-angle light scattering (MALS) signal values and baseline ultraviolet (UV) signal values of a pure buffer flowed from a chromatographic purification system to the set of instruments,
wherein the set of instruments comprises a MALS instrument and a UV detector;
in response to receiving the baseline MALS signal values from the MALS instrument,
receiving, by the computer system, from the MALS instrument scattering intensity values of a sample solution flowed from the chromatographic purification system to the MALS instrument over a time series,
wherein the sample solution comprises at least one type of macromolecule,
calculating, by the computer system, an average of the baseline MALS signal values, and
subtracting, by the computer system, the average of the baseline MALS signal values from the scattering intensity values, resulting in an intensity time series of excess scattering intensity values, $Iscatt_j$;

in response to receiving the baseline UV signal values from the UV detector, receiving, by the computer system, from the UV detector UV absorption values of the sample solution flowed from the chromatographic purification system to the UV detector over the time series, calculating, by the computer system, an average of the baseline UV signal values, executing, by the computer system, a set of logical operations applying UV absorption alignment corrections with respect to UV absorption alignment parameters and UV absorption band broadening corrections with respect to UV absorption band broadening parameters, to the UV absorption values over the time series relative to the UV detector and the MALS instrument, resulting in corrected UV absorption values over the time series, and subtracting, by the computer system, the average of the baseline UV signal values from the corrected UV absorption values, resulting in a UV time series of excess UV absorption values;

calculating, by the computer system, concentration values of the sample solution, $c_j$, with respect to the UV time series of excess UV absorption values and an absorption coefficient of the sample solution according to Beer's Law;

receiving, by the computer system, pH values of the sample solution from a pH detector, over the time series, and conductivity values of the sample solution from a conductivity detector, over the time series, wherein the set of instruments further comprises the pH detector and the conductivity detector;

executing, by the computer system, a set of logical operations applying pH alignment corrections with respect to pH alignment parameters to the pH values over the time series relative to the pH detector and the MALS instrument, resulting in corrected pH values over the time series, and applying conductivity alignment corrections with respect to conductivity alignment parameters to the conductivity values over the time series relative to the conductivity detector and the MALS instrument, resulting in corrected conductivity values over the time series, resulting in a plurality of signals comprising the intensity time series of excess scattering intensity values, $Iscatt_j$, the concentration values of the sample solution, $c_j$, the corrected pH values, and the corrected conductivity values;

executing, by the computer system, a set of logical operations averaging each of the plurality of signals over time ranges, $t_1, t_2, \ldots t_n$, wherein the time series comprises the time ranges, wherein the time ranges correspond to fractions of the sample solution collected by a fraction collector connected to the set of instruments, resulting in average values, $[Iscatt, c, pH, cond]_1$, $[Iscatt, c, pH, cond]_2, \ldots [Iscatt, c, pH, cond]_n$;

receiving, by the computer system, aggregate content values, $\% agg_1, \% agg_2, \ldots \% agg_n$, and weight-average molar mass values, $M_1, M_2, \ldots M_n$, of the fractions of the sample solution measured by a SEC-MALS instrument; and storing, by the computer system, in a macromolecular characterization look-up table (MCLUT) the aggregate content values, $\% agg_1, \% agg_2, \ldots \% agg_n$, and the weight-average molar mass values, $M_1, M_2, \ldots M_n$, versus the average values, $[Iscatt, c, pH, cond]_1$, $[Iscatt, c, pH, cond]_2, \ldots [Iscatt, c, pH, cond]_n$.

2. The method of claim 1 further comprising:

receiving, by the computer system, from a second set of instruments second baseline MALS signal values and second baseline UV signal values of the pure buffer flowed from a second chromatographic purification system to the second set of instruments, wherein the second set of instruments comprises a second MALS instrument and a second UV detector;

in response to receiving the second baseline MALS signal values from the second MALS instrument, receiving, by the computer system, from the second MALS instrument second scattering intensity values of a second sample solution flowed from the second chromatographic purification system to the second MALS instrument over a second time series, wherein the second sample solution contains the at least one type of macromolecule, calculating, by the computer system, an average of the second baseline MALS signal values, and subtracting, by the computer system, the average of the second baseline MALS signal values from the second scattering intensity values, resulting in a second intensity time series of excess scattering intensity values, Iscatt2;

in response to receiving the second baseline UV signal values from the second UV detector, receiving, by the computer system, from the second UV detector second UV absorption values of the second sample solution flowed from the second chromatographic purification system to the second UV detector over the second time series, calculating, by the computer system, an average of the second baseline UV signal values, and executing, by the computer system, a set of logical operations applying second UV absorption alignment corrections with respect to second UV absorption alignment parameters and second UV absorption band broadening corrections with respect to second UV absorption band broadening parameters, to the second UV absorption values over the second time series relative to the second UV detector and the second MALS instrument, resulting in second corrected UV absorption values over the second time series, and subtracting, by the computer system, the average of the second baseline UV signal values from the second corrected UV absorption values, resulting in a second UV time series of excess UV absorption values;

calculating, by the computer system, second concentration values of the second sample solution, c2, with respect to the second UV time series of excess UV absorption values and a second absorption coefficient of the second sample solution according to Beer's Law;

receiving, by the computer system, second pH values of the second sample solution from a second pH detector, over the time series, and second conductivity values of the second sample solution from a second conductivity detector, over the time series, wherein the second set of instruments further comprises the second pH detector and the second conductivity detector;

executing, by the computer system, a set of logical operations applying second pH alignment corrections with respect to second pH alignment parameters to the second pH values over the second time series relative to the second pH detector and the second MALS instrument, resulting in second corrected pH values over the second time series, and applying second conductivity alignment corrections with respect to second conductivity alignment parameters to the second conductivity values over the second time series relative to the second conductivity detector and the second MALS instrument, resulting in second corrected conductivity values over the second time series, resulting in a second plurality of signals comprising the second intensity time series of excess scattering intensity values, Iscatt2, the second concentration values of the second sample solution, c2, the second corrected pH values, and the second corrected conductivity values;

retrieving, by the computer system, from the MCLUT an aggregate content value, % agg, and an weight-average molar mass, M, corresponding to the second plurality of signals, via at least one of correlation, interpolation, and extrapolation;

executing, by the computer system, a set of logical operations determining whether at least one property of the second sample solution has reached an aggregate content limit, with respect to at least one of the retrieved aggregate content value, % agg, the retrieved weight-average molar mass, M, and the second concentration values of the second sample solution, c2; and in response to determining that the at least one property of the second sample solution has reached the aggregate content limit, transmitting, by the computer system, a divert-to-waste command to divert the sample solution to a waste container.

3. The method of claim 2 wherein the determining that the at least one property of the second sample solution has reached the aggregate content limit comprises
determining, by the computer system, that the retrieved aggregate content value, % agg, exceeds a maximum aggregate content value.

4. The method of claim 2 wherein the determining that the at least one property of the second sample solution has reached the aggregate content limit comprises
determining, by the computer system, that the retrieved weight-average molar mass, M, exceeds a maximum weight-average molar mass value.

5. The method of claim 2 wherein the determining that the at least one property of the second sample solution has reached the aggregate content limit comprises:
calculating, by the computer system, an accumulated aggregate content value, % $agg_{accumulated}$, with respect to a subset of aggregate content values, % $agg_k$, retrieved from the MCLUT and a subset of the second concentration values, $c2_k$,
wherein % $agg_k$ and $c2_k$ are determined from an effective beginning of an elution from the second chromatographic purification system; and
executing, by the computer system, a set of logical operations determining that the accumulated content value, % $agg_{accumulated}$, exceeds a maximum accumulated aggregate content value.

6. The method of claim 5 wherein the effective beginning of the elution of the second sample solution from the second chromatographic purification system corresponds to a time of receipt by the computer system of a trigger signal from the second chromatographic purification system.

7. The method of claim 5 wherein the effective beginning of the elution of the second sample solution from the second chromatographic purification system corresponds to a time when a concentration value of the second sample solution has reached a minimum acceptable value.

8. The method of claim 5 wherein the effective beginning of the elution of the second sample solution from the second chromatographic purification system corresponds to a time when a weight average molar mass of the second sample solution is within an acceptable range of molar mass values.

9. The method of claim 8
wherein the second sample solution comprises a protein, and
wherein the acceptable range of molar mass values corresponds to a molar mass of a monomeric protein within the second sample solution.

10. The method of claim 5 wherein the effective beginning of the elution of the second sample solution from the second chromatographic purification system corresponds to at least two of (a) a time of receipt by the computer system of a trigger signal from the second chromatographic purification system, (b) a time when a concentration value of the second sample solution has reached a minimum acceptable value, and (c) a time when a weight average molar mass of the second sample solution is within an acceptable range of molar mass values.

11. The method of claim 2 further comprising:
retrieving, by the computer system, from the MCLUT, an expected value of Iscatt according to measured values of c2, conductivity, and pH for a specific portion of the second sample solution flowing from the second chromatographic purification system, Iscatt_exp1;
calculating, by the computer system, an average value of Iscatt2 measured for the specific portion of the second sample solution flowing from the second chromatographic purification system, Iscatt_meas1; and
multiplying, by the computer system, the second time series of excess scattering intensity values, Iscatt2, by a ratio of Iscatt_exp1 to Iscatt_meas1,
resulting in adjusted values of Iscatt2.

12. The method of claim 11
wherein the second sample solution comprises a protein, and
wherein the specific portion of the second sample solution flowing from the second chromatographic purification system corresponds to a monomeric protein.

13. A computer implemented method comprising:
receiving, by a computer system, from a set of instruments baseline MALS signal values and baseline UV signal values of a pure buffer flowed from a chromatographic purification system to the set of instruments,
wherein the set of instruments comprises a MALS instrument and a UV detector;
in response to receiving the baseline MALS signal values from the MALS instrument,
receiving, by the computer system, from the MALS instrument scattering intensity values of a sample solution flowed from the chromatographic purification system to the MALS instrument over a time series,
wherein the sample solution contains the at least one type of macromolecule,
calculating, by the computer system, an average of the baseline MALS signal values, and subtracting, by the computer system, the average of the baseline MALS signal values from the scattering intensity values,
resulting in a intensity time series of excess scattering intensity values, Iscatt;
in response to receiving the baseline UV signal values from the UV detector,
receiving, by the computer system, from the UV detector UV absorption values of the sample solution flowed from the chromatographic purification system to the UV detector over the time series,
calculating, by the computer system, an average of the baseline UV signal values,
executing, by the computer system, a set of logical operations applying UV absorption alignment corrections with respect to UV absorption alignment parameters and UV absorption band broadening corrections with respect to UV absorption band broadening parameters, to the UV absorption values over the time series relative to the UV detector and the MALS instrument, resulting in corrected UV absorption values over the time series, and
subtracting, by the computer system, the average of the baseline UV signal values from the corrected UV absorption values,
resulting in a UV time series of excess UV absorption values;
calculating, by the computer system, concentration values of the sample solution, c, with respect to the UV time series of excess UV absorption values and an absorption coefficient of the sample solution according to Beer's Law;
receiving, by the computer system, pH values of the sample solution from a pH detector, over the time series, and conductivity values of the sample solution from a conductivity detector, over the time series,
wherein the set of instruments further comprises the pH detector and the conductivity detector;
executing, by the computer system, a set of logical operations applying pH alignment corrections with respect to pH alignment parameters to the pH values over the time series relative to the pH detector and the MALS instrument, resulting in corrected pH values over the second time series, and applying conductivity alignment corrections with respect to conductivity alignment parameters to the conductivity values over the time series relative to the conductivity detector and the MALS instrument, resulting in corrected conductivity values over the time series,
resulting in a plurality of signals comprising the intensity time series of excess scattering intensity values, Iscatt, the concentration values of the sample solution, c, the corrected pH values, and the corrected conductivity values;
retrieving, by the computer system, from a macromolecular characterization look-up table (MCLUT) an aggregate content value, % agg, and an weight-average molar mass, M, corresponding to the plurality of signals, via at least one of correlation, interpolation, and extrapolation;
executing, by the computer system, a set of logical operations determining whether at least one property of the sample solution has reached an aggregate content limit, with respect to at least one of the retrieved aggregate content value, % agg, the retrieved weight-average molar mass, M, and the concentration values of the second sample solution, c; and in response to determining that the at least one property of the sample solution has reached the aggregate content limit, transmitting, by the computer system, a divert-to-waste command to divert the sample solution to a waste container.

14. A system comprising:
a memory; and
a processor in communication with the memory, the processor configured to perform a method comprising
receiving from a set of instruments baseline multi-angle light scattering (MALS) signal values and baseline ultraviolet (UV) signal values of a pure buffer flowed from a chromatographic purification system to the set of instruments,
wherein the set of instruments comprises a MALS instrument and a UV detector, in response to receiving the baseline MALS signal values from the MALS instrument,
receiving from the MALS instrument scattering intensity values of a sample solution flowed from the chromatographic purification system to the MALS instrument over a time series,
wherein the sample solution comprises at least one type of macromolecule,
calculating, by the computer system, an average of the baseline MALS signal values, and
subtracting, by the computer system, the average of the baseline MALS signal values from the scattering intensity values,
resulting in an intensity time series of excess scattering intensity values, $Iscatt_j$,
in response to receiving the baseline UV signal values from the UV detector,
receiving, by the computer system, from the UV detector UV absorption values of the sample solution flowed from the chromatographic purification system to the UV detector over the time series,
calculating, by the computer system, an average of the baseline UV signal values,
executing, by the computer system, a set of logical operations applying UV absorption alignment corrections with respect to UV absorption alignment parameters and UV absorption band broadening corrections with respect to UV absorption band broadening parameters, to the UV absorption values over the time series relative to the UV detector and the MALS instrument, resulting in corrected UV absorption values over the time series, and
subtracting, by the computer system, the average of the baseline UV signal values from the corrected UV absorption values,
resulting in a UV time series of excess UV absorption values;
calculating, by the computer system, concentration values of the sample solution, $c_j$, with respect to the UV time series of excess UV absorption values and an absorption coefficient of the sample solution according to Beer's Law,
receiving, by the computer system, pH values of the sample solution from a pH detector, over the time series, and conductivity values of the sample solution from a conductivity detector, over the time series,
wherein the set of instruments further comprises the pH detector and the conductivity detector,
executing, by the computer system, a set of logical operations applying pH alignment corrections with respect to pH alignment parameters to the pH values over the time series relative to the pH detector and the MALS instrument, resulting in corrected pH values over the time series, and applying conductivity alignment corrections with respect to conductivity alignment parameters to the conductivity values over the time series relative to the conductivity detector and the MALS instrument, resulting in corrected conductivity values over the time series, resulting in a plurality of signals comprising the intensity time series of excess scattering intensity values, $Iscatt_j$, the concentration values of the sample solution, $c_j$, the corrected pH values, and the corrected conductivity values, executing, by the computer system, a set of logical operations averaging each of the plurality of signals over time ranges, $t_1, t_2, \ldots t_n$, wherein the time series comprises the time ranges, wherein the time ranges correspond to fractions of the sample solution collected by a fraction collector connected to the set of instruments, resulting in average values, $[Iscatt, c, pH, cond]_1$, $[Iscatt, c, pH, cond]_2, \ldots [Iscatt, c, pH, cond]_n$, receiving, by the computer system, aggregate content values, $\% \ agg_1, \% \ agg_2, \ldots agg_n$, and weight-average molar mass values, $M_1, M_2, \ldots M_n$, of the fractions of the sample solution measured by a SEC-MALS instrument, and storing, by the computer system, in a macromolecular characterization look-up table (MCLUT) the aggregate content values, $\% \ agg_1, \% \ agg_2, \ldots \% \ agg_n$, and the weight-average molar mass values, $M_1, M_2, \ldots M_n$, versus the average values, $[Iscatt, c, pH, cond]_1$, $[Iscatt, c, pH, cond]_2, \ldots [Iscatt, c, pH, cond]_n$.

\* \* \* \* \*